United States Patent [19]
Kapell et al.

[11] Patent Number: 5,774,172
[45] Date of Patent: Jun. 30, 1998

[54] INTERACTIVE GRAPHICS OVERLAY ON VIDEO IMAGES FOR ENTERTAINMENT

[75] Inventors: JoGene Kapell, Bellevue; Holly A. Serdy, Redmond, both of Wash.

[73] Assignee: Microsoft Corporation, Redmond, Wash.

[21] Appl. No.: 600,302

[22] Filed: Feb. 12, 1996

[51] Int. Cl.$^6$ .................................................. H04N 7/173
[52] U.S. Cl. ........................... 348/13; 348/564; 348/589; 348/10; 455/6.3
[58] Field of Search .................................. 348/13, 12, 9, 348/10, 11, 7, 6, 1, 578, 584, 585, 586, 587, 588, 589, 590, 591, 592, 593, 594, 595, 596, 599, 600, 601, 563, 564, 906, 598; 455/5.1, 4.2, 6.1, 6.2, 6.3; 358/183, 186; 395/327, 328, 349, 977; H04N 7/16, 7/173, 5/262, 5/265, 5/268, 5/272, 5/275, 5/278, 9/74, 9/75, 9/76, 5/445

[56] References Cited

U.S. PATENT DOCUMENTS

| | | | |
|---|---|---|---|
| 5,293,540 | 3/1994 | Trani et al. | 348/584 |
| 5,519,450 | 5/1996 | Urbanus et al. | 348/589 |
| 5,523,791 | 6/1996 | Berman | 348/584 |
| 5,524,195 | 6/1996 | Clanton, III et al. | 395/155 |
| 5,539,479 | 7/1996 | Bertram | 348/564 |
| 5,543,857 | 8/1996 | Wehmeyer et al. | 348/564 |
| 5,579,057 | 11/1996 | Banker et al. | 348/589 |
| 5,610,665 | 3/1997 | Berman | 348/564 |

*Primary Examiner*—Mark R. Powell
*Assistant Examiner*—Chris Grant
*Attorney, Agent, or Firm*—Lee & Hayes, PLLC

[57] ABSTRACT

A video entertainment system includes a video display device and a user interface unit connected for operation in conjunction with the video display device to receive a television image and to display the television image on the video display device. The system also includes a remote control handset having viewer-actuable controls. The remote control handset sends commands to the user interface unit in response to actuation of the viewer-actuable controls. The user interface unit has a graphics overlay component which is programmable to display entertainment images on the video display device overlying the received television image. The user interface unit has a viewer participation program that a viewer can initiate with the remote control handset. The viewer participation program allows the viewer to use the remote control handset to draw, "drop," or "throw" designs or pre-rendered graphics on top of the television image. Further aspects of the invention include the ability to attach a pre-rendered image to a moving point within a television image so that the pre-rendered image moves with the moving point. Using this capability, the viewer can attach, for example, a hat to someone's head, and the hat will stay on the person's head regardless of the person's movement within the television frame.

24 Claims, 3 Drawing Sheets

INTERACTIVE GRAPHICS OVERLAY ON VIDEO IMAGES FOR ENTERTAINMENT

TECHNICAL FIELD

This invention relates to television and video viewing apparatus and methods.

BACKGROUND OF THE INVENTION

TV programs evoke a variety of responses from viewers. These responses include positive responses such as laughter, applause, and approval, as well as more negative responses such as ridicule, derision, frustration, and anger. Certain programs, for example those dealing with sports or politics, have been known to produce very intense and sometimes violent reactions. It is not beyond imagination that such reactions might sometimes lead to the destruction of property, such as might be the case if a viewer were to vent his or her anger and frustration on the TV receiver itself. Even if such immediate and dramatic consequences are prevented, pent-up anger generated by certain TV programs certainly has a negative emotional impact on a viewer.

One frustration with broadcast television results from the fact that viewing is strictly a passive activity—there are seldom any opportunities for a viewer to participate. One potential solution to this problem would be to allow viewing audiences to choose or vote on the course of a program's plot or story line, such as has been done in some movie theaters. Even if this were practical with broadcast TV, however, it would be most appropriate only with story-type programs rather than with other types of programs such as those relating to news, politics, or sports, or to live programs such as talk shows. In addition, providing alternate story lines would add tremendous costs to the production of a TV show.

What is needed is a simpler and more feasible system for allowing viewers to interact with TV programs without causing physical damage to television viewing hardware. The invention described below meets this need.

SUMMARY OF THE INVENTION

The invention is a system and method for allowing a viewer to draw, "drop," or "throw" graphics designs or images over a television image. Using a remote control handset, a viewer can, for instance, draw on a television image using drawing or painting tools of the viewer's choice. Alternately, the viewer can press a handset button to select a particular pre-rendered image, and then use cursor control buttons to move the selected image on the screen of a television receiver. Similarly, the viewer can select and initiate animated sequences. The pre-rendered graphics and animated sequences are provided to allow the viewer to express his or her feelings about the received television image. For instance, pre-rendered static images might be available to display derogatory statements through text or graphics. Positive statements might also be provided, although it is envisioned that they will not be as popular as negative statements.

As a further aspect of the invention, point coordinates are transmitted with a television image to specify a point in the image which is moving with respect to the viewer's display frame. The moving point is keyed to the movement of an entity within the television image. When pre-rendered images are selected by a user, they can be positioned at the moving point and thereafter will automatically move within the display frame along with the moving point. For instance, a mustache might be positioned at a specified moving point corresponding to a person's upper lip. As the person moves, the mustache moves with the person and stays over the person's upper lip.

The invention allows active and continuous interaction with broadcast television programs in an interesting, new, and fun way.

DETAILED DESCRIPTION OF A PREFERRED EMBODIMENT

Figure 1:
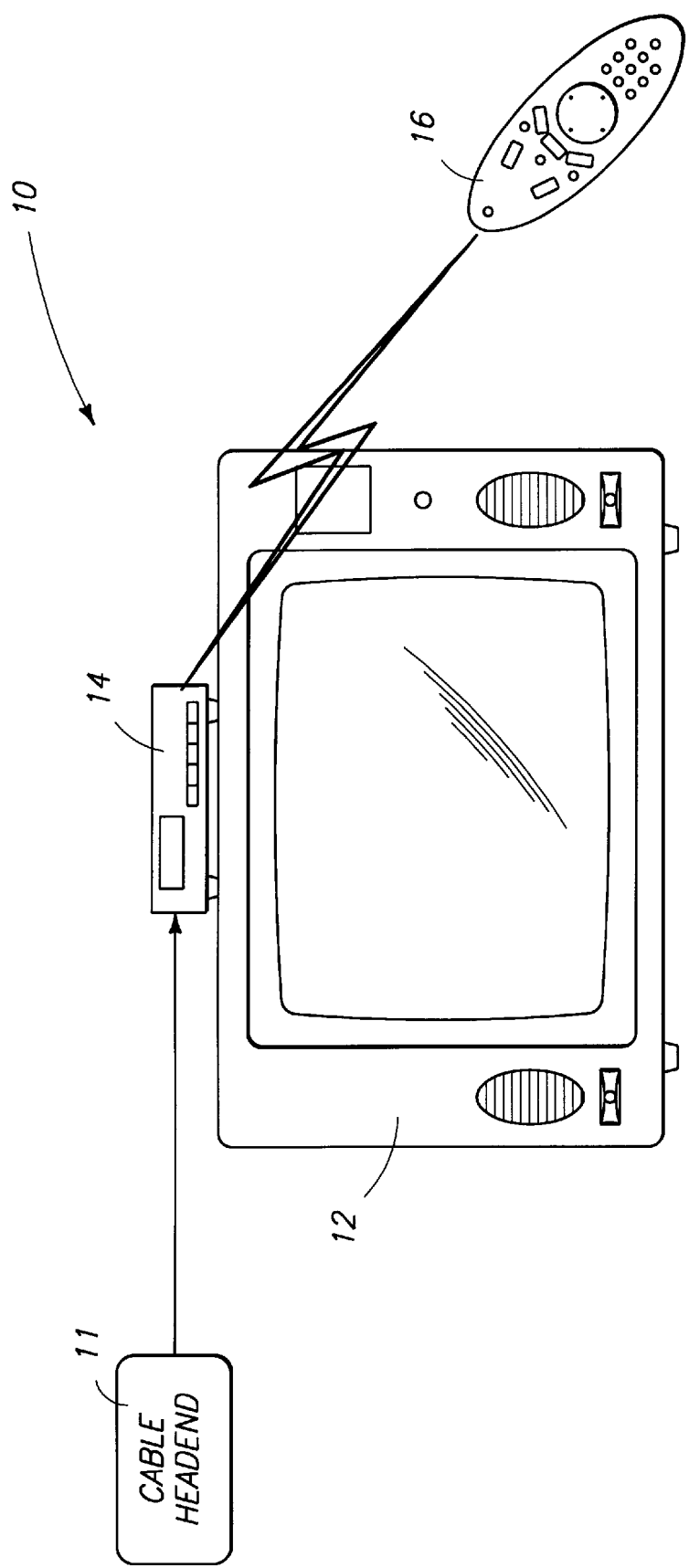
FIG. 1 is a block diagram of an interactive entertainment distribution and viewing system in accordance with a preferred embodiment of the invention.

FIG. 1 shows an interactive entertainment distribution and viewing system 10 in accordance with a preferred embodiment of the invention. Entertainment system 10 includes a cable headend 11 and a plurality of video display devices 12 such as conventional television receivers. It also includes a set-top box or user interface unit 14 connected for operation in conjunction with each video display device 12 to receive and display television images. For purposes of this explanation, only one TV receiver and associated set-top box are shown.

Set-top box (STB) 14 performs the functions of a conventional unit of this nature, such as controlling channel selection and decoding premium broadcast channels. One of the primary purposes of STB 14 is to receive broadcast television signals and images from television broadcasters and to display said signals or images on video display device 12. In this context, the term "television image" is used to indicate moving pictures or images such as conventionally displayed by television receivers, without regard for transmission medium. A viewer is generally unable to control the content of television images except for perhaps pausing, replaying, or fast-forwarding them. This is in contrast to other types of video images which are generated through direct interaction with a viewer, such as images produced by interactive video games.

While television images have traditionally been transmitted over the airwaves, current and proposed technology allows television image transmission over different types of cable and satellite systems, employing both analog and digital transmission formats. Television images are also available from local, in-home sources such as video cassette recorders.

In the preferred embodiment described herein, headend 11 acts as a source of one or more television images which it broadcasts over a cable distribution system. However, the invention can be implemented in conjunction with many types of television or video distribution systems. Furthermore, while STB 14 is shown as a discrete component, it might alternatively be built into a television receiver or other video display device.

The preferred cable distribution system is an interactive system having bi-directional communications with the various STBs of the system. For example, STB 14 might communicate with the headend using ATM (asynchronous transfer mode) network protocols.

Figure 2:
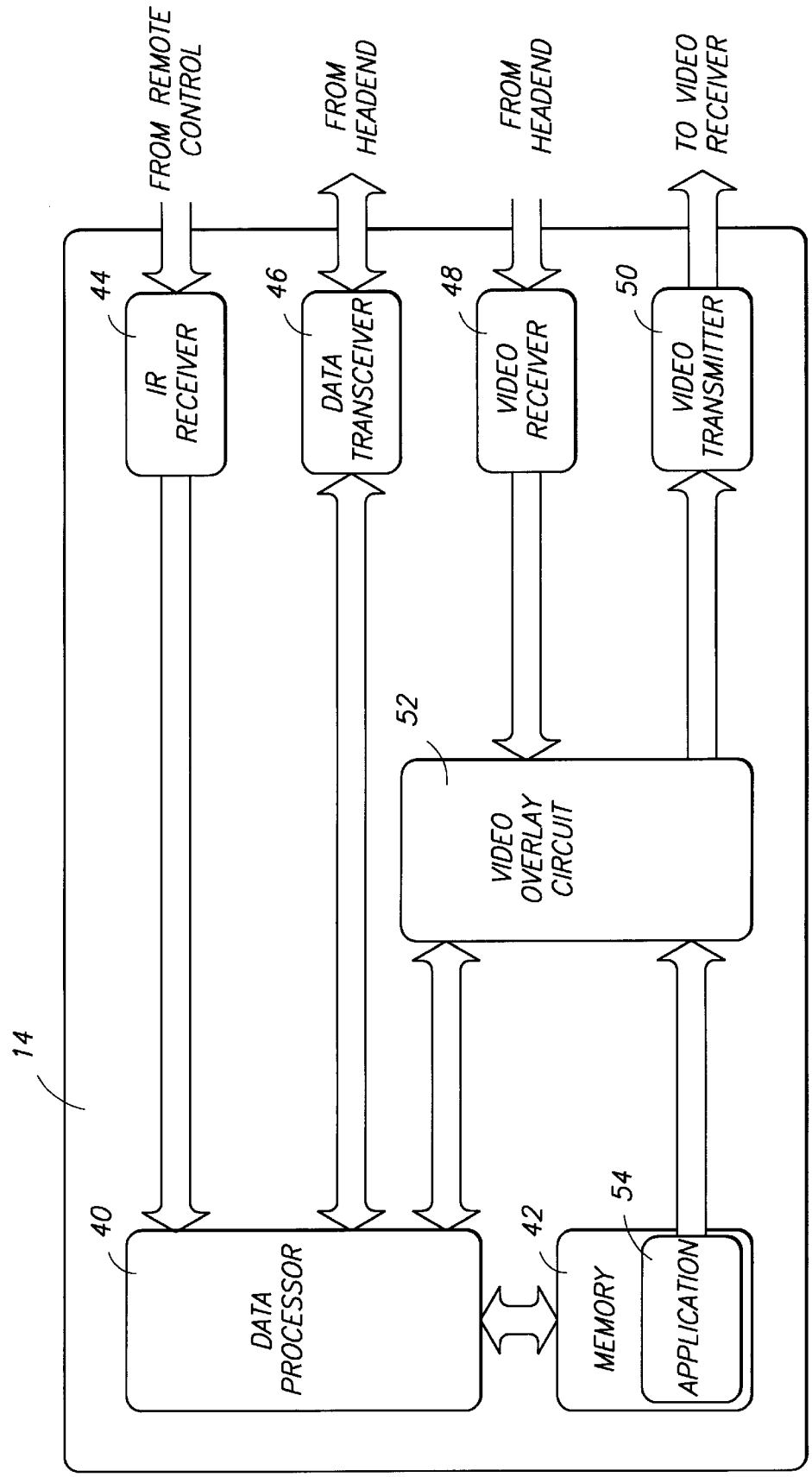
FIG. 2 is a block diagram of a user interface unit in accordance with the preferred embodiment of the invention.

FIG. 2 shows pertinent components of STB 14, including a data processor 40 and associated program memory 42.

STB 14 also includes an infra-red (IR) receiver 44 for receiving commands from remote control handset 16, a data transceiver 46 for receiving data from headend 11, a video receiver 48 for receiving video or television images from headend 11, and a video transmitter connected to display the received television images on video display device 12. Data processor 40 is connected to receive commands from IR receiver 44 and to communicate with the headend through data transceiver 46. In some systems, data and video information may be received via a common transmission medium. For example, conventional TV transmission presently uses a portion of an RF signal to transmit television images and another portion transmit data such as closed-captioning information. Cable systems conventionally have separate channels dedicated to data transfer. While provision for data transfer is important for certain aspects of the invention, other aspects of the invention can be implemented even in the absence of data transfer capabilities.

STB 14 includes a video overlay component or circuit 52 which is programmable by data processor 40 to display graphics or other images, including bit-mapped images, on video display device 12 overlying a background television image. Such a component is typically used in an STB to convey functional information to a viewer regarding items such as channel selection, volume, etc. In this case, however, video overlay component 52 is used for an additional purpose which will be described below. Video overlay component 52 is preferably of a type which allows hardware control of pre-rendered graphics sprites and which allows such sprites to be displayed on display device 12 over the received television image. A graphics sprite is a small image that can be moved on a display screen independently of other images in the background (such as the television image in this case). Sprites are created or drawn within a block of pixels that the controlling program can then manipulate as a unit.

Remote control handset 16 works in conjunction with STB 14 to allow a viewer to give various commands to the STB such as to change channels. The remote control handset has viewer-actuable controls such as push-buttons which the viewer can press to issue commands to the STB. Such commands are communicated by an infra-red signal and received by STB 14 through its IR receiver 44.

Figure 3:
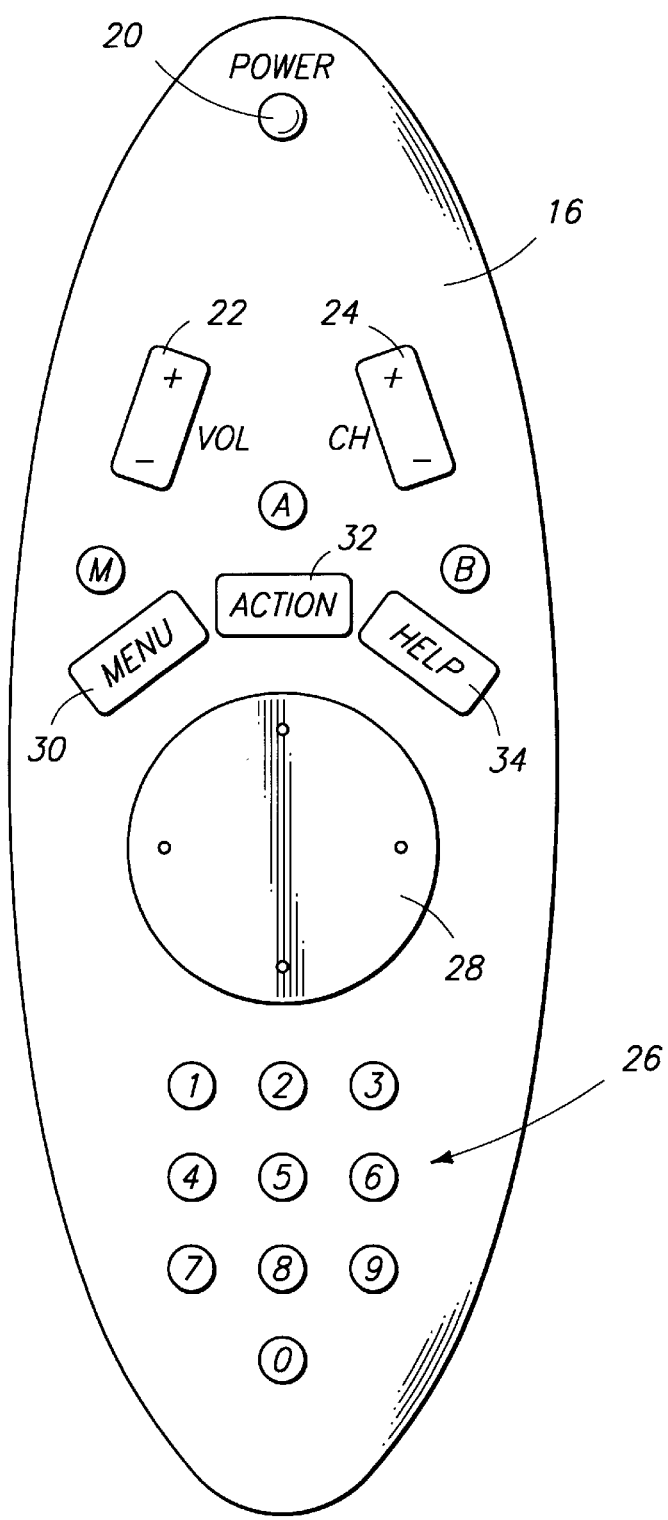
FIG. 3 shows a remote control handset used in conjunction with the preferred embodiment of the invention.

One example of a remote control handset is shown in FIG. 3. It includes a power on/off button 20, volume and channel up/down buttons 22 and 24, numeric keys 26, cursor control keys or a single cursor control button 28, a MENU button 30, an ACTION button 32, a HELP button 34, and miscellaneous keys labeled M, A, and B. In normal STB operation, these buttons or keys are used for obvious purposes, such as to control volume and channel selection. Certain keys, such as the M, A, B, MENU, ACTION and HELP keys might be used primarily for interactive applications executing on the STB. The cursor control button 28 can be pressed in one of four directions to move a cursor on the video display device.

A video entertainment system in accordance with the invention includes an interactive application 54, referred to herein as a viewer participation program, which executes on data processor 40 from memory 42. The interactive application is a program which executes in response to a command issued by a viewer from remote control handset 16. The program has features for allowing viewers to make their "mark" on broadcast television. For instance, while watching a football game a viewer can "throw" an electronic tomato that splats on the screen. While watching a talent search program, a viewer might choose to "throw" a bucket of water at a particular contestant. A viewer might draw over TV personalities to add facial features such as mustaches, or to "fix" a personality's hair. In general, the viewer participation program is responsive to the viewer-actuable controls of the remote control handset to allow a viewer to display one or more graphics entities or entertainment images over the received television image on the video display device. The term "entertainment" image is used herein to indicate an image that is strictly for the entertainment of the viewer, and that has no other practical function such as is normally the case with graphics displayed by an STB's video overlay circuit. Entertainment images in the context of this invention include static, pre-rendered graphics sprites, pre-rendered animated sprites or video sequences, and other designs and shapes that are drawn by a user.

Interactive application 54 makes use of cursor control key 28, numeric keys 26, and ACTION button 32 of remote control handset 16. As an example, pressing a particular numeric key allows the viewer to select a drawing tool for drawing shapes and designs over the received television image. Such a drawing tool might comprise a "pen" or "spray can" which is visible on the TV screen. Pressing the numeric key more than once changes the characteristics of the design produced by the tool (such as color and line or pattern type). Actual drawing is initiated by pressing ACTION key 32 and moving the tool with a cursor control key 28. Drawing is terminated by pressing the ACTION key again.

Other numeric keys might be used to select pre-rendered graphics sprites for placement over the television image. For instance, pressing a particular numeric key might display a mustache which can then be moved with the cursor control key. Pressing the same numeric key might change the characteristics of the mustache or display a completely different graphics sprite. Once the desired sprite is selected in this manner, it is moved and anchored with the cursor key and the ACTION button. Drawn or placed images and designs disappear after a pre-defined duration.

Many other entertainment images of this nature can of course be made available, and application 54 is configured to change the available images either randomly or in coordination with the program currently being viewed. Pre-rendered sprites are supplied as part of the viewer participation program itself, or downloaded dynamically from the headend (assuming data transfer capabilities are present). The viewer is required to experiment to determine which images are associated with which numeric keys.

As a further feature, available in systems having data transfer capabilities, headend 11 repeatedly sends or broadcasts point coordinates to accompany the broadcast television image. Such point coordinates specify a moving point in the received broadcast television image which is keyed in position relative to a moving entity in the television image. When an entertainment image or sprite is activated by a viewer by pressing an appropriate key, the STB will attach the image or graphics entity to the moving point and will thereafter automatically move the entertainment image along with the moving point. For example, a particular set of point coordinates might specify the position of a TV personality's upper lip. When the viewer activates an entertainment image such as a mustache, the mustache will place itself appropriately over the upper lip of the TV personality and will move as the personality moves. Preferably, the headend also sends graphics data specifying appropriate pre-rendered sprites for use in conjunction with transmitted point coordinates.

Some numeric keys select objects that can be "thrown." With these keys, a viewer can select and place one or more animated video sequences over the received television image to simulate the effect of throwing something. When an animated video sequence is selected, the viewer is allowed to select a target location on the television image using cursor control button 28. Pressing the ACTION key initiates the animated video sequence at the position pointed to by the cursor. For instance, a viewer might position the cursor over a particular TV personality and press ACTION to simulate throwing a tomato. The animation would show a tomato splatting on the screen of the video display device, along with appropriate sound effects. Pressing a numeric key more than once allows different animated sequences to be selected so that different articles can be thrown.

Other types of animations are also optionally included. For example, one such animation shows a miniature person walking around on the screen of the video display device over the broadcast television image. When the viewer presses the ACTION button, the person holds up a sign with an appropriate textual message.

Further optional features of the invention include the ability for TV programs to interact with viewers. With this feature, the viewer participation program notifies the source of the television image when particular entertainment images have been selected and displayed on the viewer's video display device. For instance, the program source might be notified when a tomato is thrown. In response to such a notification, the television image source sends responsive entertainment images for display on the viewer's video display device. The response is preferably automated by a program associated with the television program. This program can execute at the headend itself or at another location with communications capabilities with the headend.

A further optional feature includes the ability for viewers to interact with each other. With this feature, the particular viewer participation program executing on a first user interface unit transmits any selection of entertainment images to a remote or second user interface unit such as a neighbor's or friend's user interface unit. The remote user interface unit then displays the selected entertainment images locally. Images selected at the remote site are likewise transmitted to the first user interface unit and displayed there. Depending on the communications capability of the particular distribution system, communications between user interface units might be routed through the headend.

Although the invention has been described primarily in terms of its physical and operational details, the invention also includes the methodical steps implemented by the particular apparatus described above. Such methodical steps include sending or broadcasting a television image and receiving the image at set-top box in a viewer's home. Further methodical steps include sending point coordinates with the television image to specify a moving point in the broadcast image. The moving point is keyed in position with a moving entity within the television image. Preferred steps of the invention further include displaying the television image on a video display device and thereafter accepting commands from a viewer via a remote control handset. In response to commands from the viewer, the STB is programmed for selecting and displaying one or more entertainment images on the video display device over a portion of the received broadcast television image. The viewer can initiate different types of actions, allowing the viewer to draw lines, drop pre-defined graphics images, or to initiate pre-rendered animation sequences. The methods of the invention further include automatically moving displayed images to follow specified moving points. The displayed images are called entertainment images because are dis-played strictly for entertainment. They perform no useful function relative to operation of the STB or the associated video display device.

There are of course many variations in how the invention might be implemented. For instance, the viewer interaction program might be resident in each set-top box or it might be downloaded as required. User interface characteristics are similarly subject to a multitude of design choices, many of which might be dependent upon the particular operating environment under which the viewer participation program will be executed. Variations in implementation and design are therefore expected and are intended to fall within the scope of this invention. The invention is claimed in any of its forms or modifications within the proper scope of the appended claims appropriately interpreted in accordance with the doctrine of equivalents.

We claim:

1. A video entertainment system comprising:

a video display device;

a user interface unit connected for operation in conjunction with the video display device to receive a television image and to display said television image on the video display device;

the user interface unit having a graphics overlay component which is programmable to display entertainment images on the video display device overlying the received television image;

the user interface unit having a viewer participation program, the user interface unit be being responsive to viewer commands when the viewer participation program has been initiated to allow the viewer to display one or more entertainment images over the received television image on the video display device;

wherein the received television image has accompanying point coordinates which specify a moving point in the received television image, the moving point being keyed in position to a moving entity within the received television image, the user interface unit being further responsive to viewer commands to position one of the entertainment images over the received television image relative to the specified moving point and to automatically move said entertainment image on the video display device along with said specified moving point.

2. A system as recited in claim 1 wherein the one or more entertainment images comprises pre-rendered graphic sprites.

3. A system as recited in claim 1 wherein the one or more entertainment images comprises pre-rendered animated video sequences.

4. A system as recited in claim 1, further comprising a remote control handset having viewer-actuable controls, the user interface unit being further responsive to the viewer-actuable controls of the remote control handset to allow the viewer to draw one or more shapes over the received television image on the video display device.

5. A system as recited in claim 1, further comprising a remote control handset having viewer-actuable controls, the user interface unit being further responsive to the viewer-actuable controls of the remote control handset to allow the viewer to select and place one or more pre-rendered graphics sprites over the television image on the video display device.

6. A system as recited in claim 1, further comprising a remote control handset having viewer-actuable controls, the user interface unit being further responsive to the viewer-actuable controls of the remote control handset to allow the viewer to place and initiate one or more pre-rendered animated video sequences over the received television image on the video display device.

7. A system as recited in claim 1, further comprising a remote control handset having viewer-actuable controls, wherein the viewer-actuable controls include one or more cursor position controls, the user interface unit being responsive to the cursor position controls when the viewer participation program has been initiated to position the entertainment images on the video display device.

8. A system as recited in claim 1, further comprising a remote control handset having viewer-actuable controls, wherein the viewer-actuable controls include one or more cursor position controls, the user interface unit being responsive to the cursor position controls when the viewer participation program has been initiated to move the entertainment images on the video display device.

9. A user interface unit for operation in conjunction with a video display device to receive a television image and to display said television image on the video display device, the user interface unit comprising:

a remote control handset having viewer-actuable controls, the remote control handset sending commands to the user interface unit in response to actuation of the viewer-actuable controls;

a graphics overlay component that is programmable to display one or more entertainment images on the video display device overlying the received television image;

a data processor connected to receive commands from the remote control handset in response to actuation of the viewer-actuable controls and connected to program the graphics overlay component;

the data processor being programmed to execute a viewer participation program in response to a command from the remote control handset, the data processor being programmed when executing the viewer participation program to allow a viewer to display one or more entertainment images over the received television image on the video display device by actuating the viewer-actuable controls;

wherein the received television image has accompanying point coordinates that specify a moving point in the received television image, the moving point being keyed in position to a moving entity within the received television image, the data processor being further programmed when the viewer participation program is executing for positioning one of the entertainment images over the received television image relative to the specified moving point and to automatically move said entertainment image along with said specified moving point.

10. A user interface unit as recited in claim 9, wherein the data processor accepts commands from the remote control handset for drawing one or more shapes over the received television image on the video display device.

11. A user interface unit as recited in claim 9, wherein the data processor accepts commands from the remote control handset for selecting and placing one or more pre-rendered graphics sprites over the received television image on the video display device.

12. A user interface unit as recited in claim 9, wherein the data processor accepts commands from the remote control handset for placing and initiating one or more pre-rendered animated video sequences over the received television image on the video display device.

13. A user interface unit as recited in claim 9, wherein the viewer-actuable controls include one or more cursor position controls, the data processor being further programmed when the viewer participation program is executing for positioning the entertainment images on the video display device in response to the cursor position controls.

14. An interactive entertainment distribution and viewing system comprising:

a headend which broadcasts a television image;

a plurality of user interface units connected for operation in conjunction with video display devices to receive and display the television image;

remote control handsets associated with the user interface units, each remote control handset having viewer-actuable controls, the remote control handsets sending commands to the user interface units in response to actuation of the viewer-actuable controls;

each user interface unit having a graphics overlay component which is programmable to display one or more entertainment images on the associated video display device overlying the television image;

at least one of the user interface units having a viewer participation program that executes on the user interface unit in response to a command from the associated remote control handset, the viewer participation program being responsive to the viewer-actuable controls of the remote control handset to allow the viewer to display a graphics entity over the television image;

wherein the viewer participation program notifies the source of the television image when particular entertainment images have been selected and displayed on the video display device.

15. A system as recited in claim 14, wherein in response to being notified when particular entertainment images have been selected and displayed on the video display device, the source of the television image sends responsive entertainment images for display on the video display device.

16. An interactive entertainment distribution and viewing system comprising:

a headend which broadcasts a television image;

a plurality of user interface units connected for operation in conjunction with video display devices to receive and display the television image;

remote control handsets associated with the user interface units, each remote control handset having viewer-actuable controls, the remote control handsets sending commands to the user interface units in response to actuation of the viewer-actuable controls;

each user interface unit having a graphics overlay component which is programmable to display one or more entertainment images on the associated video display device overlying the television image;

at least one of the user interface units having a viewer participation program that executes on the user interface unit in response to a command from the associated remote control handset, the viewer participation program being responsive to the viewer-actuable controls of the remote control handset to allow the viewer to display a graphics entity over the television image;

wherein the headend transmits point coordinates corresponding to the television image to specify a moving point in the television image, said moving point being keyed in position to a moving entity within the television image; and wherein the viewer participation program positions the graphics entity at the moving point in the television image specified by the point coordinates, the user interface unit automatically moving said graphics entity along with said moving point.

17. An interactive entertainment distribution and viewing system comprising:

a headend which broadcasts a television image;

a plurality of user interface units connected for operation in conjunction with video display devices to receive and display the television image;

remote control handsets associated with the user interface units, each remote control handset having viewer-actuable controls, the remote control handsets sending commands to the user interface units in response to actuation of the viewer-actuable controls;

each user interface unit having a graphics overlay component which is programmable to display one or more entertainment images on the associated video display device overlying the television image;

at least one of the user interface units having a viewer participation program that executes on the user interface unit in response to a command from the associated remote control handset, the viewer participation program being responsive to the viewer-actuable controls of the remote control handset to allow the viewer to display a graphics entity over the television image;

wherein in response to displaying a graphics entity the viewer participation program transmits said graphics entity to a remote user interface unit for display on its video display device.

18. A method of displaying television images on a video display device, comprising the following steps:

receiving a television image;

displaying the television image on a video display device;

accepting commands from a viewer;

in response to commands from said viewer, selecting and displaying one or more entertainment images on the video display device overlying a portion of the received television image;

transmitting the television image from a source;

notifying the source of television image when particular entertainment images have been selected and displayed on the video display device.

19. A method as recited in claim 18, further comprising drawing one or more shapes over the received television image on the video display device in response to commands from the viewer.

20. A method as recited in claim 18, further comprising placing one or more pre-rendered graphics sprites over the received television image on the video display device in response to commands from the viewer.

21. A method as recited in claim 18, further comprising placing and initiating one or more pre-rendered animated video sequences over the received television image on the video display device in response to commands from the viewer.

22. A method as recited in claim 21, further comprising:

in response to being notified when particular entertainment images have been selected and displayed on the video display device, sending responsive entertainment images from the source of the television image for display on the video display device.

23. A method of displaying television images on a video display device, comprising the following steps:

receiving a television image;

displaying the television image on a video display device;

accepting commands from a viewer;

in response to commands from said viewer, selecting and displaying one or more entertainment images on the video display device overlying a portion of the received television image;

transmitting the television image;

sending point coordinates with the television image to specify a moving point in the television image;

keying the moving point in position to a moving entity within the received television image;

positioning one of the entertainment images over the received television image on the video display device relative to the specified moving point in response to commands from the viewer; and automatically moving said one entertainment image along with said specified moving point.

24. A method of displaying television images on a video display device, comprising the following steps:

reeiving a television image;

displaying the television image on a video display device;

accepting commands from a viewer;

in response to commands from said viewer, selecting and displaying one or more entertainment images on the video display overlying a portion of the received television image;

in response to selecting and displaying entertainment images on the video display device, transmitting said entertainment images for display on another video display device.

* * * * *